United States Patent [19]

Scheibli

[11] Patent Number: 4,523,925
[45] Date of Patent: Jun. 18, 1985

[54] PROCESS FOR DYEING OR PRINTING CELLULOSE TEXTILE FIBER MATERIALS WITH REACTIVE DYES CONTAINING FLUORO-TRIAZINE

[75] Inventor: Peter Scheibli, Bottmingen, Switzerland

[73] Assignee: Ciba-Geigy Corporation, Ardsley, N.Y.

[21] Appl. No.: 500,742

[22] Filed: Jun. 3, 1983

[30] Foreign Application Priority Data

Sep. 6, 1982 [CH] Switzerland ............... 3557/82

[51] Int. Cl.³ .................. C09B 62/04; D06P 3/66; D06P 1/38
[52] U.S. Cl. .................................. 8/549; 8/680; 8/688; 8/918; 8/924
[58] Field of Search ...................... 8/549, 688

[56] References Cited

U.S. PATENT DOCUMENTS

| 3,326,887 | 6/1967 | Riat ..................... 260/153 |
| 4,115,378 | 9/1978 | Bien et al. ............. 260/146 T |
| 4,261,889 | 4/1981 | Seiler et al. ........... 260/153 |
| 4,294,580 | 10/1981 | Henk et al. ........... 8/549 |

FOREIGN PATENT DOCUMENTS

| 2903594 | 8/1980 | Fed. Rep. of Germany . |
| 899376 | 6/1962 | United Kingdom . |
| 1529645 | 10/1978 | United Kingdom . |
| 2006805 | 5/1979 | United Kingdom . |
| 1549820 | 8/1979 | United Kingdom . |
| 2024236 | 1/1980 | United Kingdom . |
| 1577498 | 10/1980 | United Kingdom . |
| 2128200 | 4/1984 | United Kingdom . |

*Primary Examiner*—A. Lionel Clingman
*Attorney, Agent, or Firm*—Joseph G. Kolodny

[57] ABSTRACT

A process for dyeing or printing textile fiber materials with reactive dyes comprises using reactive dyes of the formula

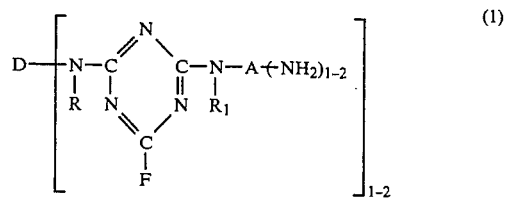

in which D is the radical of an organic dye, R and $R_1$ independently of each other are hydrogen or substituted or unsubstituted $C_{1-4}$-alkyl, and A is a substituted or unsubstituted aliphatic or aromatic radical, and produces dyeings or prints having good fastness properties.

16 Claims, No Drawings

PROCESS FOR DYEING OR PRINTING CELLULOSE TEXTILE FIBER MATERIALS WITH REACTIVE DYES CONTAINING FLUORO-TRIAZINE

The present invention relates to the technical field of using reactive dyes for dyeing or printing textile fiber materials.

Reactive dyes have long been widely used for dyeing and printing textiles made of fiber materials. However, in view of increasing demands made on reactive dyeings in respect of economics, application technology and fastness level, the state of the art reached is in many cases not fully satisfactory.

The object of the present invention is to find a novel, improved process for dyeing or printing textile fiber materials with reactive dyes which leads to fast dyeings and prints.

The present invention provides a novel process which meets the requirements set.

The process comprises using reactive dyes of the formula

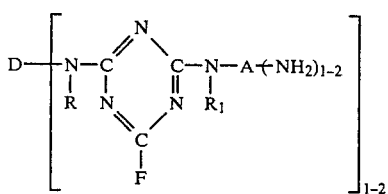
(1)

in which D is the radical of an organic dye, R and $R_1$ independently of each other are hydrogen or substituted or unsubstituted $C_{1-4}$-alkyl, and A is a substituted or unsubstituted aliphatic or aromatic radical.

The radical D is in particular the radical of a sulfo-containing organic dye of the monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarboximide series.

The radical D in the formula (1) can be substituted in a conventional manner, and it contains in particular one or more sulfonic acid groups.

Examples of other substituents on the radical D are alkyl groups having 1 to 4 carbon atoms, such as methyl, ethyl, propyl, isopropyl and butyl, alkoxy groups having 1 to 4 carbon atoms, such as methoxy, ethoxy, propoxy, isopropoxy and butoxy, acylamino groups having 1 to 6 carbon atoms, such as acetylamino and propionylamino, benzoylamino, amino, alkylamino having 1 to 4 carbon atoms, phenylamino, alkoxycarbonyl having 1 to 4 carbon atoms in the alkoxy radical, nitro, cyano, trifluoromethyl, halogen, such as fluorine, chlorine and bromine, sulfamoyl, carbamoyl, ureido, hydroxyl, carboxyl, sulfomethyl and sulfo.

Reactive dyes in which D is the radical of an azo dye contain as substituents in particular methyl, ethyl, methoxy, benzoylamino, amino, acetylamino, ureido, sulfomethyl, hydroxyl, carboxyl, halogen and sulfo.

An alkyl radical R or $R_1$ in formula (1) is a straight-chain or branched alkyl radical which can also be substituted, for example by halogen, hydroxyl, cyano or sulfo. Examples of R are methyl, ethyl, propyl, isopropyl, butyl, isobutyl, sec.-butyl, tert.-butyl, β-chloroethyl, β-hydroxyethyl, β-hydroxybutyl, β-cyanoethyl and sulfomethyl.

The aliphatic or aromatic radical A is preferably an alkylene or arylene radical. The expression aliphatic radical also includes cycloaliphatic radicals.

For instance, A can be a straight-chain or branched alkylene radical which is long (for example has 10 or more carbon atoms) or shorter; it can be in particular an alkylene radical having 2 to 6 carbon atoms, for example ethylene, propylene, butylene, hexylene or cyclohexylene.

An arylene radical A is, for example, a naphthylene radical, the radical of a diphenyl or stilbene or in particular a phenylene radical. The radical A can contain further substituents, for example halogen atoms, such as fluorine, chlorine and bromine, alkyl groups having 1 to 4 carbon atoms, such as methyl, ethyl and propyl, alkoxy groups having 1 to 4 carbon atoms, such as methoxy, ethoxy, propyloxy and isopropyloxy, carboxyl or sulfo.

The process of the invention preferably uses:

(a) reactive dyes of the formula (1) in which D is the radical of a sulfo-containing organic dye of one of the series given above, R and $R_1$ independently of each other are hydrogen, methyl or ethyl, and A is substituted or unsubstituted $C_{2-6}$-alkylene or substituted or unsubstituted phenylene or naphthylene;

If the radical bonded via the $-N(R_1)-$ bridging member to the s-triazine ring is a naphthalene radical, it can be in the α- or β-position;

(b) reactive dyes as in (a), of the formula

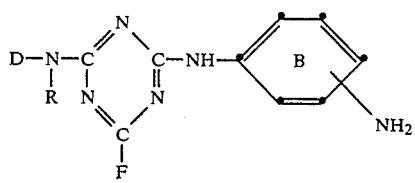
(2)

in which D and R are as defined under (a), and the benzene radical B can contain as further substituents $C_{1-4}$-alkyl, $C_{1-4}$-alkoxy, halogen, carboxyl, sulfo or amino;

(c) reactive dyes as in (b), of the formula

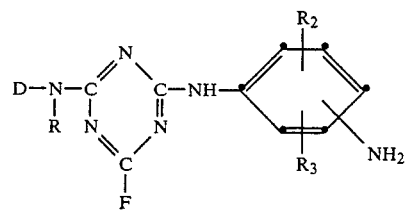
(3)

in which D and R are as defined under (b), $R_2$ is hydrogen or methyl, and $R_3$ is hydrogen, carboxyl, sulfo or amino;

(d) reactive dyes as in (a), of the formula

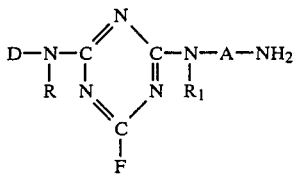

in which D, R and $R_1$ are as defined under (a), and A is ethylene or propylene which can be substituted by hydroxyl;

(e) reactive dyes of the formula (1) in which D is the radical of a monoazo or disazo dye;

(f) reactive dyes of the formula (1) in which D is the radical of a metal complex azo or formazan dye;

(g) reactive dyes of the formula (1) in which D is the radical of an anthraquinone dye;

(h) reactive dyes as in (f), in which D is the radical of a metal complex azo dye of the benzene or naphthalene series;

(i) reactive dyes as in (h), in which D is the radical of a 1:1 copper complex azo dye of the benzene or naphthalene series, and the copper atom is bonded on either side to a metallizable group in ortho-position relative to the azo bond;

(j) reactive dyes as in (e), of the formula

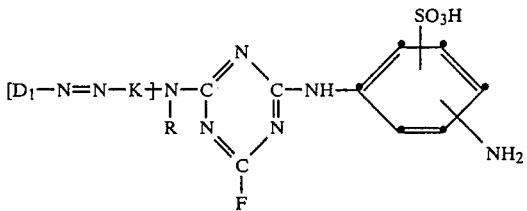

in which $D_1$ is the radical of a diazo component of the benzene or naphthalene series, K is the radical of a coupling component of the benzene or naphthalene series or of the heterocyclic series, and R is hydrogen or substituted or unsubstituted $C_{1-4}$-alkyl, and the reactive radical is bonded to the diazo component or to the coupling component; and (k) reactive dyes as in (j), in which R is hydrogen, methyl or ethyl.

Dyes of the formula (1) are fiber-reactive.

Fiber-reactive compounds are to be understood as meaning those which are capable of forming covalent chemical bonds with the hydroxyl groups of cellulose or with the amino groups of natural or synthetic polyamides.

Formula (1) reactive dyes used in the process of the invention are prepared by condensing an organic dye of the formula

or a dye precursor, 2,4,6-trifluoro-s-triazine and a compound of the formula

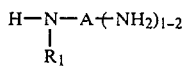

where D, R, $R_1$ and A in the formulae (6) and (7) are as defined under the formula (1), and if dye precursors have been used converting the resulting intermediate compounds into the desired end dyes.

In the process described in the preceding paragraph, the individual steps can be carried out in various orders and some, if desired, even simultaneously, to give various versions of the process. The reaction is generally carried out in successive steps.

In the process, it depends on the structure of the starting materials, in particular those of the formulae (6) and (7), which of the possible versions of the process gives the best results, or under which specific conditions, for example at which condensation temperature, the reaction should best be carried out.

In an important embodiment, 2,4,6-trifluoro-s-triazine is condensed first with an organic dye of the formula (6) and then with a compound of the formula (7).

Or 2,4,6-trifluoro-s-triazine is first reacted with a compound of the formula (7), and the resulting difluorotriazine compound is condensed with an organic dye of the formula (6).

Reactive dyes of the formula (1) in which D is the radical of an organic dye composed of two or more components can also be prepared by a version of the process which starts from dye precursors. This version is carried out by condensing such a component of the dye of the formula (6) as contains a —N(R)H group with 2,4,6-trifluoro-s-triazine and reacting it at a suitable stage of the process, if desired even beforehand, with a compound of the formula (7) and with the other component(s) of the dye of the formula (6), and if desired following this with another conversion reaction.

Examples of such organic dyes as are composed of two or more components are monoazo, disazo, trisazo, tetrazo, metal complex azo, formazan and azomethine dyes.

The above version of the process is especially important for preparing reactive dyes of the formula (1) in which D is the radical of a sulfo-containing azo dye. In these dyes, that part of the azo dye radical to which the reactive radical is directly bonded can be either the radical of the diazo component or the radical of the coupling component. As a result there are two important embodiments of the above version of the process.

In one of the two embodiments, a —N(R)H-containing diazo component of the dye is condensed with 2,4,6-trifluoro-s-triazine and the resulting condensation product is diazotized and coupled onto a coupling component and condensed with a compound of the formula (7) before or after the condensation or after the coupling.

In the second embodiment, a —N(R)H-containing coupling component of the dye is condensed with 2,4,6-trifluoro-s-triazine and the resulting condensation product is coupled onto a diazotized diazo component and condensed with a compound of the formula (7) before or after the condensation or after the coupling.

In these embodiments it is possible to prepare reactive dyes of the formula (1) which contain two reactive radicals by condensing a diazo component which contains a —N(R)H group with 2,4,6-trifluoro-s-triazine, and also condensing a coupling component which contains a —N(R)H group with 2,4,6-trifluoro-s-triazine, and diazotizing the condensation product of the diazo component and coupling it onto the condensation product of the coupling component, the R in the condensation product of the diazo component being independent of the R in the condensation product of the coupling component, and condensing both triazine radicals with compounds of the formula (7) before or after the coupling.

Dyes of the formula (1) which contain two reactive radicals can also be prepared by using dyes of the formula (6) which contain in D a further —N(R)H group, and condensing them with such an amount of 2,4,6-trifluoro-s-triazine that two fluorotriazine radicals are introduced into the dye molecule, and then condensing the product with a suitable amount of a compound of the formula (7).

It is preferred to use as starting materials organic dyes of the formula (6) in which D is the radical of a monoazo or disazo dye.

A preferred way of carrying out the process comprises using as starting materials organic dyes of the formula $$\left[ D_1-N=N-K \right]-[-NHR]_{1-2} \quad (8)$$

in which $D_1$ is the radical of a diazo component of the benzene or naphthalene series and K is the radical of a coupling component of the benzene or naphthalene series or of the heterocyclic series.

If the finished reactive dyes of the formula (1) contain complexing groups, they can subsequently be reacted with heavy metal donors.

Another preferred method of preparation uses dyes of the formula (6) in which D is the radical of a metal complex azo or formazan dye.

Compounds which are preferably used as compounds of the formula (7) have the formula

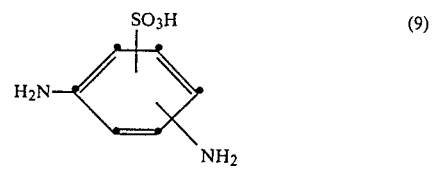

The condensation of 2,4,6-trifluoro-s-triazine with organic dyes of the formula (6) or the —N(R)H-containing diazotizable and/or couplable components preferably takes place in aqueous solution or suspensions at low temperatures, preferably between 0° and 5° C., and at weakly acid, neutral to weakly alkaline pH. The hydrogen fluoride liberated in the course of the condensation is advantageously continuously neutralized by adding aqueous alkali metal hydroxides, carbonates or bicarbonates. To react the fluorotriazine dyes thus obtained, or to react 2,4,6-trifluoro-s-triazine, with compounds of the formula (7), the free amines or salts thereof, preferably the hydrochloride, are used. The reaction is carried out at temperatures between about 0° and 40°, preferably between 5° and 25° C., in the presence of an acid-binding agent, preferably sodium carbonate, within pH 2–8, preferably pH 5–6.5.

The condensation of the fluorotriazine with a compound of the formula (7) can take place before or after the condensation of the fluorotriazine with a dye of the formula (6). The condensation of the fluorotriazine with a compound of the formula (7) preferably takes place in aqueous solution or suspension at a low temperature and at weakly acid to neutral pH. Here too the hydrogen fluoride liberated in the course of the condensation is advantageously neutralized by continuously adding aqueous alkali metal hydroxides, carbonates or bicarbonates.

There now follow some specific examples of starting materials which can be used for preparing reactive dyes of the formula (1).

Candidates for use as dyes of the formula (6) are in particular dyes of the following structural types:

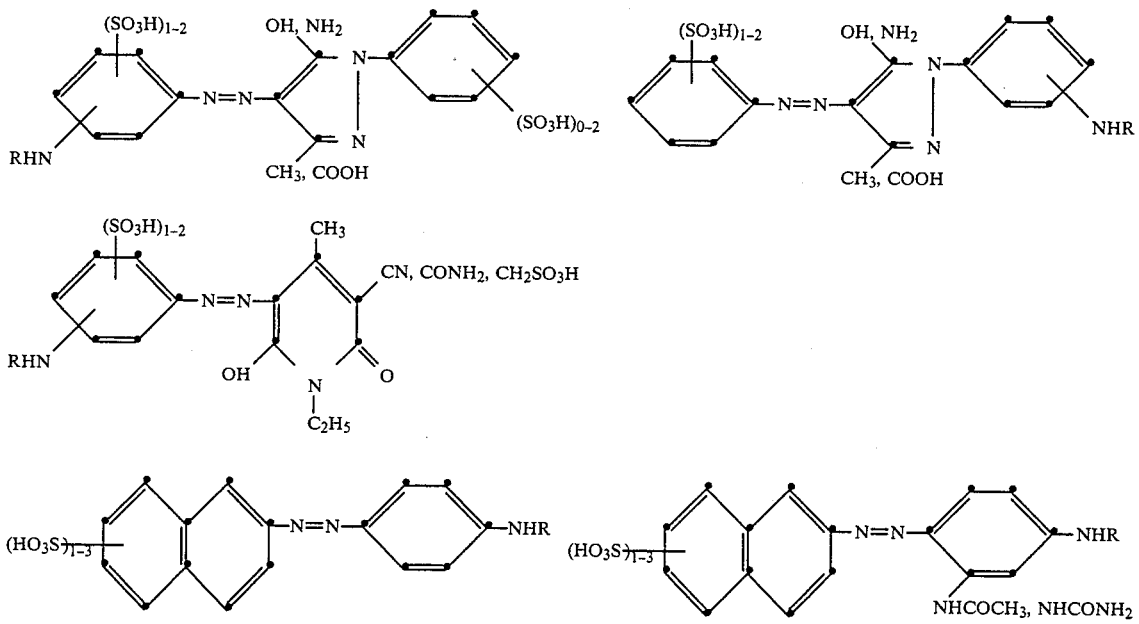

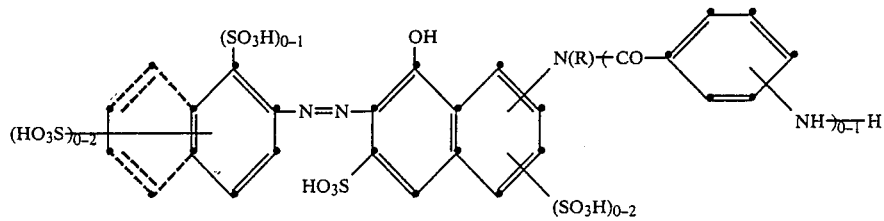

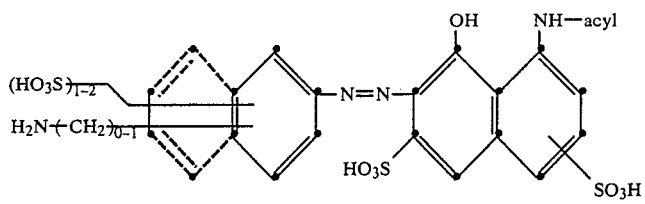

in which acyl is, for example, acetyl or substituted or unsubstituted benzoyl.

Metal complexes of dyes of the formulae:

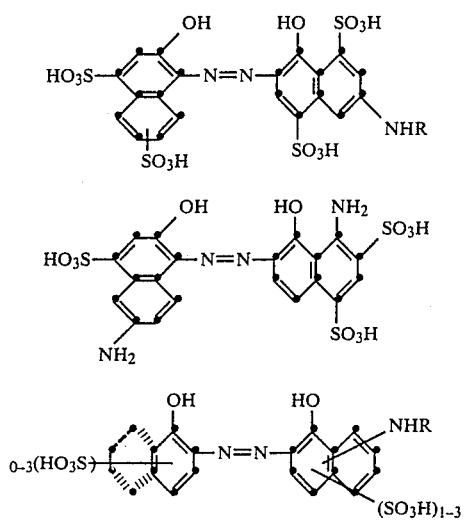

The metal atom is preferably Cu (1:1 complex) or Cr and Co (1:2 complex). Cr complexes and Co complexes can contain one or two molecules of the azo compound of the formula shown above, i.e. they can be symmetrical or contain any other ligand group and be asymmetrical.

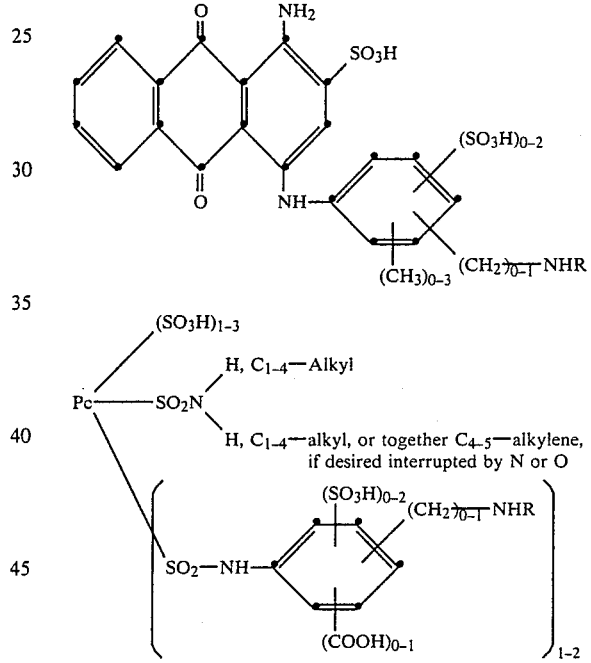

In this formula, Pc is the Cu or Ni phthalocyanine radical, and the total number of substituents on the Pc skeleton is 4.

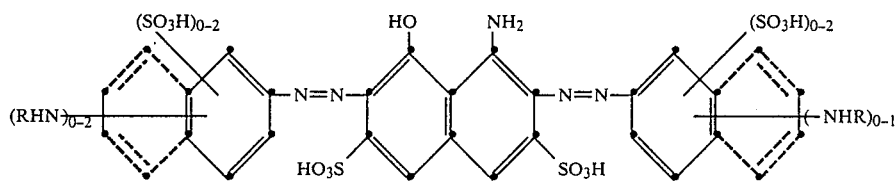

The fused rings shown as broken lines represent naphthalene systems, which are possible alternatives.

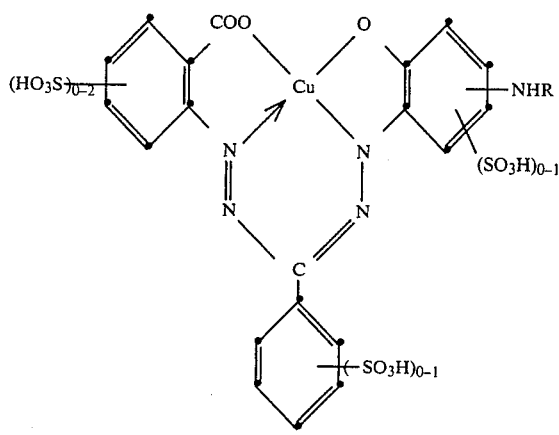

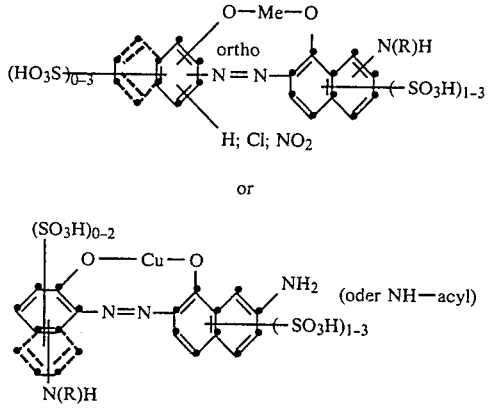

The dyes of the formulae given above can be further substituted in the alkyl or aryl radicals, in particular by the substituents mentioned in the explanation of D in the formula (1).

The following are particularly important azo dyes of the formula (8):

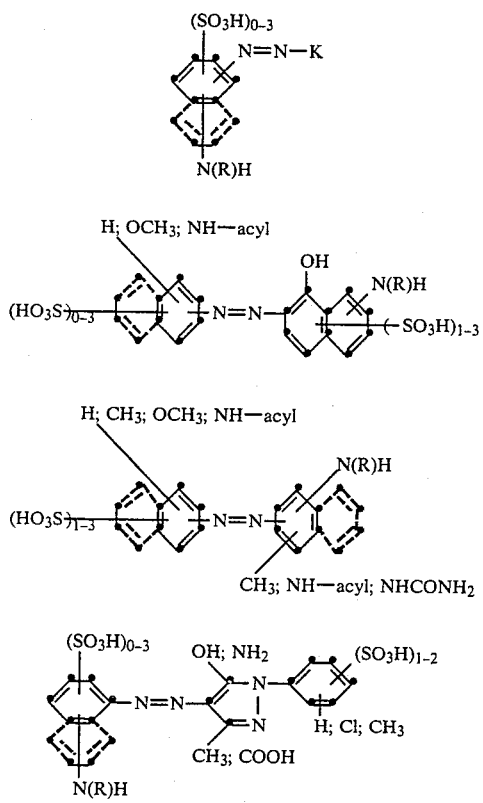

in which K is the radical of a coupling component of the benzene, naphthalene or heterocyclic series, acyl is a low molecular weight aliphatic acyl radical containing at most 3 carbon atoms or an aromatic radical containing at most 8 carbon atoms, and R is as defined in the explanation of formula (1), and metal complex azo dyes of the formulae in which R and acyl are as defined above and Me is Cu, Cr or Co.

2,4,6-Trifluoro-s-triazine (cyanuric fluoride) or primary condensation products of 2,4,6-trifluoro-s-triazine with the compounds of the formula (7) mentioned below.

Compounds of the formula (7): methylenediamine, ethylenediamine, n-propylenediamine, n-butylenediamine, 1-methyl-n-propylenediamine, n-hexylenediamine, 2-ethyl-n-butylenediamine, 2-hydroxy-n-propylenediamine, 1-amino-3-methylaminopropane, β-(β-aminoethylamino)ethylamine, 1,2,3-triaminopropane, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-di-aminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene- 4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- or 4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyl oxide, 4,4'-diaminodiphenylurea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid and 1,3,5-triaminobenzene.

If the starting materials used to prepare the preferred reactive dyes of the formula (1), in which D is the radical of an azo dye, are not finished amino dyes, for example those described above, but dye precursors, i.e. the diazo and coupling components, then the following are examples of such components:

Diazo components:

aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-aminobiphenyl, 1-aminobenzene-2-, -3- or -4-carboxylic acid, 2-aminodiphenyl ether, 1-aminobenzene-2-, -3- or -4-sulfonamide, or -N-methylamide, -N-ethylamide, -N,N-dimethylamide or -N,N-diethylamide, dehydrothio-p-toluidinesulfonic acid, 1-amino-3-trifluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1,3-diaminobenzene-4-sulfonic acid, 1,4-diaminobenzene-3-sulfonic acid, 1,4-diaminobenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid and 3-methoxy-4-amino-6-methylazobenzene-2',5'-disulfonic acid.

Coupling components:

phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene- 3,6- or -6,8- disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl-or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or -ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 3-methylpyrazol-5-one, 1-phenyl-3-methyl-5-pyrazolone, 1-(4'-sulfophenyl)-3-methyl-5-pyrazolone, 1-(4'-sulfophenyl)-pyrazol-5-one-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfonaphth-2'-yl)-3-methyl-5-pyrazolone, 1-(5',7'-disulfonaphth-2'-yl)-3-methyl-5-pyrazolone, 1-(2',5'-dichloro-4'-sulfophenyl)-3-methyl-5-pyrazolone, 3-aminocarbonyl-4-methyl-6-hydroxypyrid-2-one, 1-ethyl-3-cyano- or -3-chloro-4-methyl-6-hydroxypyrid-2-one, 1-ethyl-3-sulfomethyl-4-methyl-6-hydroxypyrid-2-one, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis-(2'-hydroxyethylamino)-3-cyano-4-methylpyridine, 1-ethyl-3-carbamoyl-4-methyl-6-hydroxypyrid-2-one, 1-ethyl-3-sulfomethyl-4-methyl-5-carbamoyl-6-hydroxypyrid-2-one, N-acetoacetylaminobenzene, 1-(N-acetoacetylamino)-2-methoxybenzene-5-sulfonic acid, 4-hydroxyquinol-2-one, 1-amino-8-hydroxy-2-(phenylazo)-naphthalene-3,6-disulfonic acid, 1-amino-8-hydroxy-2-(4'-sulfophenylazo)-naphthalene-3,6-disulfonic acid and 1-amino-8-hydroxy-2-(2',5'-disulfophenylazo)naphthalene-3,6-disulfonic acid.

If dye precursors are used as starting materials, at least one of the two components, either the diazo component or the coupling component, has to have an acylatable amino group. The intermediates containing a diazotizable amino group are generally diazotized by the action of nitrous acid in an aqueous/mineral acid solution at a low temperature, and the coupling takes place at weakly acid, neutral to weakly alkaline pH.

The process of the invention is used to prepare dyeings and prints on any kind of textile fiber material, such as silk, leather, wool, polyester fibers, polyamide fibers and polyurethanes, but in particular fibrous material made of or containing cellulose, such as linen, hemp, wood pulp, regenerated cellulose and especially cotton. The process of the invention is also suitable for dyeing or printing hydroxyl-containing fibers present in blend fabrics, for example mixtures of cotton with polyester fibers or polyamide fibers. The process of the invention is suitable for dyeing by the exhaust method, where the three-stage dyeing method gives particularly good results. In this method, an exhaust stage at neutral pH is followed by two alkaline fixing stages which differ in pH and/or temperature. The process of the invention is also suitable for dyeing by the pad-steam dyeing method, in which the goods are impregnated with aqueous dye solutions which can also contain salt and the dyes are fixed, if desired, under heat, after a treatment with alkali or in the presence of alkali. The process is particularly suitable for the cold pad-batch method, in which the dye is applied on a pad-mangle together with alkali and is then fixed by leaving the padded fabric to stand for several hours at room temperature.

The dyes used in the process of the invention can be applied to the fiber material and fixed on the fiber in various ways, in particular in the form of aqueous dye solutions and print pastes.

The process of the invention is carried out in the alkaline pH range by using as alkaline acid-binding agents for example sodium hydroxide, potassium hydroxide or an alkali metal salt of a weak acid, such as sodium carbonate, sodium bicarbonate, trisodium phosphate, disodium phosphate, sodium silicate or sodium trichloroacetate or mixtures of these acid-binding agents.

The dyeing liquors and print pastes containing the dye and the acid-binding agent can be applied to the material to be dyed within a wide temperature range, preferably at room temperature, namely 15° to 30° C., or at temperatures up to 60° C. An advantageous procedure is to impregnate the fiber material with the dyeing liquors which can contain neutral salts and to squeeze the impregnated fiber material, for example in a conventional manner on a pad-mangle, and to subject it, if desired after a preceding intermediate drying, to an alkali treatment or in the presence of alkali to a heat treatment, in order to fix the dyes. Prints are obtained in similar fashion, namely by printing the fiber material with said print pastes and giving the pasted fiber material an intermediate drying and subjecting it to a heat treatment in order to fix the dyes.

If dyeing takes place by the exhaust method, the dyebath contains one or more of the abovementioned acid-binding agents and can, if desired, also contain the customary additives, such as inorganic salts, urea or other dyeing assistants mentioned below. The goods are impregnated with the aqueous dye solutions, which can contain salt, and after an alkali treatment or in the presence of alkali the dyes are fixed, if desired under heat.

Depending on the concentration and the nature of the acid-binding agent, it is also possible to fix the dyes at room temperature or at slightly elevated temperatures, for example at 20° to 60° C. This cold pad-batch method involves applying the dye together with the alkali on a pad-mangle and then fixing it by leaving the moist impregnated or printed goods to stand at room temperature for several hours.

The dyeings and prints in the alkaline range can be fixed through heat by various methods customary in industry, for example by steaming with saturated steam at about 100° to 103° C. (pad-steam method) or with superheated steam at temperatures up to 150° C., by means of hot air at temperatures of 120° to 230° C. (thermofixing method), by means of infrared irradiation, by passing the goods through hot strongly salt-containing solutions, by means of hot vapours of inert organic solvents or by passing the padded or printed fabric web over a number of heated rolls.

When the dye has been fixed, the dyeings or prints are thoroughly rinsed with cold and hot water, which can contain an agent which acts like a dispersant and promotes the diffusion of the unfixed portions of the dye.

The dyeing liquors and print pastes, in addition to the alkali, can also contain the generally customary additives, the solutions for example inorganic salts, such as alkali metal chlorides or alkali metal sulfates, urea, alginate thickenings, water-soluble cellulose alkyl ethers and dispersants and levelling assistants, and the print pastes for example urea, sodium m-nitrobenzenesulfonate and the customary thickeners, such as methylcellulose, starch ethers, emulsion thickenings or preferably an alginate, for example sodium alginate.

The alkaline acid-binding agent can also be applied to the fiber material before or after the dyeing liquors or print pastes, which in this case do not contain this agent, namely for example by spraying or padding the material with an aqueous solution of the agent. The solutions of this agent can contain generally customary additives, such as those mentioned by way of example above. If these agents are applied to the goods at the same time as the dye, it is advantageous to dissolve them in the dyeing liquor or in the print paste containing the dye.

The process of the invention is preferably carried out in accordance with the exhaust, cold pad-batch or pad-steam method.

The process of the invention is particularly suitable for dyeing cotton by the exhaust dyeing method.

If performed in accordance with the exhaust method the process of the invention can be carried out at low dyeing temperatures, and if performed in accordance with the pad-steam method the process of the invention only requires short steaming times. High degrees of fixation are obtained in such a way that the difference between the degree of exhaustion and the degree of fixation is small, i.e. the hydrolysis loss is low.

The dyeings and prints prepared with the dyes used in the process of the invention are distinguished by clear shades. More particularly, on cellulose fiber materials the dyeings and prints have considerable depth of shade and substantial fiber-dye bond stability both in the acid and alkaline range and also good light fastness and very good wet fastness properties, such as fastness to washing, water, seawater, cross-dyeing and perspiration, and a good fastness to pleating, ironing and rubbing.

The process of the invention is also suitable for printing, in particular cotton, but also for printing nitrogen-containing fibers, for example wool, silk or wool-containing blend fabrics.

The examples which follow serve to illustrate the invention. The temperatures are given in degree centigrade. The parts and percentages are by weight, unless otherwise stated. Parts by weight relate to parts by volume as the kilogram relates to the liter.

EXAMPLE 1

2 parts of the reactive dye of the formula

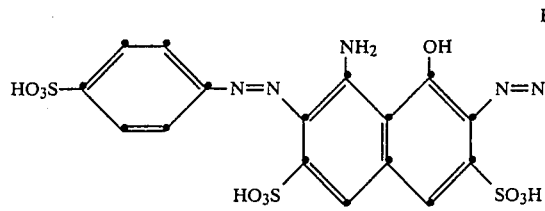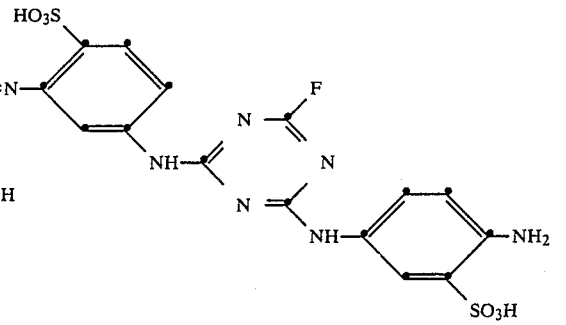

(preparation described below) are dissolved in 400 parts of water; to this are added 1,500 parts of a solution which contains 53 g of sodium chloride per liter. 100 parts of a cotton fabric are introduced into this dyebath at 40° C. 45 minutes later, 100 parts of a solution which contains per liter 16 g of sodium hydroxide and 20 g of calcined sodium carbonate are added. The temperature of the dyebath is held at 40° C. for a further 45 minutes. The dyed goods are then rinsed, are soaped with a non-ionic detergent at the boil for a quarter of an hour, are rinsed once more and dried. This gives a blue dyeing having good fastness properties. The build-up of such dyeings is excellent.

EXAMPLE 2

2 parts of the reactive dye used in Example 1 are dissolved in 400 parts of water; to this are added 1,500 parts of a solution which contains per liter 53 g of sodium chloride. 100 parts of a cotton fabric are introduced into this dyebath at 35° C. 20 minutes later, 100 parts of a solution which contains per liter 16 g of sodium hydroxide and 20 g of calcined sodium carbonate are added. The temperature of the dyebath is held at 35° C. for a further 15 minutes. The temperature is then raised, in the course of 20 minutes, to 60° C. The temperature is held at 60° C. for a further 35 minutes. The goods are then rinsed, are soaped with a nonionic detergent at the boil for a quarter of an hour, are rinsed once more and are dried. This gives a blue dyeing having good fastness properties. The build-up of such dyeings is very good.

EXAMPLE 3

4 parts of the reactive dye used in Example 1 are dissolved in 50 parts of water. To this are added 50 parts of a solution which contains per liter 5 g of sodium hydroxide and 20 g of calcined sodium carbonate. The solution obtained is used to pad-mangle a cotton fabric in such a way that its weight increases by 70%, and the fabric is then wound onto a beam. In this state, the cotton fabric is left at room temperature for 3 hours. The dyed goods are then rinsed, are soaped with a non-ionic detergent at the boil for a quarter of an hour, are rinsed once more and are dried. This gives a blue dyeing having good fastness properties.

EXAMPLE 4

8 parts of the reactive dye used in Example 1 are dissolved in 80 parts of water. To this are added 20 parts of a solution which contains per liter 40 g of sodium hydroxide and 0.25 liter of sodium silicate (38° Bé). The solution obtained is used to pad-mangle a cotton fabric in such a way that its weight increases by 70%, and the fabric is then wound up on a beam. In this state, the cotton fabric is left at room temperature for 10 hours. The dyed goods are then rinsed, are soaped with a non-ionic detergent at the boil for a quarter of an hour, are rinsed once more and are dried. This gives a black dyeing having good fastness properties. Example 5: 40 parts of the reactive dye used in Example 1 are dissolved in 50 parts of water. To this are added 20 parts of a solution which contains per liter 20 g of sodium hydrogencarbonate and 400 g of urea. The solution obtained is used to pad-mangle a cotton fabric in such a way that its weight increases by 75%, and the fabric is then dried and thermofixed at 140° C. for 60 to 90 seconds. The dyed goods are then rinsed, are soaped at the boil with a non-ionic detergent for a quarter of an hour, are rinsed once more and are dried. This gives a blue dyeing having good fastness properties.

EXAMPLE 6

2 parts of the reactive dye used in Example 1 are dissolved in 100 parts of water containing 0.5 part of sodium m-nitrobenzenesulfonate. The solution obtained is used to impregnate a cotton fabric in such a way that its weight increases by 75%, and the fabric is then dried.

The fabric is then impregnated with a warm solution at 20° C. which contains per liter 4 g of sodium hydroxide and 300 g of sodium chloride, and is squeezed down to a 75% weight increase, and the dyeing is steamed at 100° to 102° C. for 30 to 60 seconds, is rinsed, is soaped with a 0.3% boiling solution of a non-ionic detergent for a quarter of an hour, is rinsed and is dried. This gives a blue dyeing having good fastness properties.

EXAMPLE 7

3 parts of the reactive dye used in Example 1 are sprinkled into 100 parts of a stock thickening which have been stirred at high speed and contains 50 parts of 5% sodium alginate thickening, 27.8 parts of water, 20 parts of urea, 1 part of sodium m-nitrobenzenesulfonate and 1.2 parts of sodium hydrogencarbonate. A cotton fabric is printed with the resulting print paste, and the resulting printed fabric is dried and steamed in saturated steam at 102° C. for 2 to 8 minutes. The printed fabric is then rinsed, if desired soaped at the boil and rinsed once more, and is then dried. This gives a blue print having good fastness properties.

PREPARATION OF THE REACTIVE DYE USED IN EXAMPLE 1

21.1 parts of the amino-containing chromophore of the formula

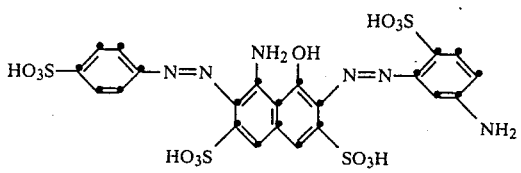

(prepared by coupling under acid conditions diazotized 1-aminobenzene- 4-sulfonic acid onto 1-amino-8-hydroxynaphthalene-3,6-disulfonic acid, coupling under alkaline conditions diazotized 1-amino-3-acetylaminobenzene-6-sulfonic acid onto the monoazo dye obtained, and hydrolyzing the resulting disazo dye) are dissolved in 400 ml of water under neutral conditions, and the solution is cooled down to 0° to 5° C. At this temperature, 4.3 parts of 2,4,6-trifluoro-1,3,5-triazine are added dropwise in the course of 15 minutes, during which the pH of the reaction mixture is maintained at 6.5 to 7.0 by the simultaneous addition of 2 N sodium hydroxide solution. After addition of a mixture, adjusted to pH 4.0, of 6.2 parts of 1,4-diaminobenzene-2-sulfonic acid and 50 ml of water, the temperature is raised, in the course of 2 to 3 hours, to 20° to 25° C., while the pH of the reaction mixture is maintained at 4.0 to 4.5 by the continuous addition of 2 N sodium hydroxide solution. When the reaction has ended, the reaction mixture is clarified and the reactive dye formed is salted out at pH 6.5 by sprinkling in sodium chloride, is filtered off, is washed and is dried in vacuo.

Further reactive dyes which, applied by the dyeing or printing methods described in the examples, produce dyeings or prints respectively with good fastness properties in the shade given in Table 1 column 3 are obtained when the amino-containing chromophores specified in column 2 are reacted in accordance with the preparation method first with 2,4,6-trifluoro-1,3,5-triazine and then with 1,4-diaminobenzene-2-sulfonic acid.

TABLE 1

| No. | Chromophore | Shade on cotton |
|---|---|---|
| 1 | 2-Aminonaphthalene-3,6,8-trisulfonic acid ⟶ 1-amino-3-methylbenzene | reddish yellow |
| 2 | 2-Aminonaphthalene-3,6,8-trisulfonic acid ⟶ 3-aminophenylurea | reddish yellow |
| 3 | 2-Aminonaphthalene-4,6,8-trisulfonic acid ⟶ 1-amino-3-methylbenzene | reddish yellow |
| 4 | 2-aminonaphthalene-4,6,8-trisulfonic acid ⟶ 1-amino-3-acetylaminobenzene | reddish yellow |
| 5 | 1-Amino-4-(2',5'-disulfophenylazo)-naphthalene-6-sulfonic acid ⟶ 1-amino-3-methylbenzene | brown |
| 6 | 1-Amino-4-(2',5'-disulfophenylazo)-naphthalene-6-sulfonic acid ⟶ 1-aminonaphthalene-6-sulfonic acid | brown |
| 7 | 1-Amino-4-(4'-sulfophenylazo)-benzene-2-sulfonic acid ⟶ 1-aminonaphthalene-6-sulfonic acid | brown |
| 8 | 1-Amino-4-(4',6',8'-trisulfonaphth-2'-ylazo)-naphthalene-6-sulfonic acid ⟶ 1-amino-3-methylbenzene | brown |
| 9 | 1-Amino-4-(2',5'-disulfophenylazo)-naphthalene-6-sulfonic acid ⟶ 1-amino-2,5-dimethylbenzene | brown |
| 10 | 1-Amino-3-acetylaminobenzene-6-sulfonic acid ⟶ 1-ethyl-3-sulfomethyl-4-methyl-6-hydroxypyrid-2-one-5-carboxamide (hydrolyzed) | yellow |
| 11 | 1-Amino-3-acetylaminobenzene-6-sulfonic acid ⟶ 1-ethyl-3-aminocarbonyl-4-methyl-6-hydroxypyrid-2-one (hydrolyzed) | yellow |
| 12 | 1-Amino-3-acetylaminobenzene-6-sulfonic acid ⟶ 1-(2'-methyl-4'-sulfophenyl)-3-carboxypyrazol-5-one (hydrolyzed) | yellow |
| 13 | 1-Amino-3-acetylaminobenzene-6-sulfonic acid ⟶ 1-(4',8'-disulfonaphth-2'-yl-3-methyl-pyrazol-5-one (hydrolyzed) | yellow |
| 14 | 2-Aminonaphthalene-1,5-disulfonic acid ⟶ 2-acetylamino-5-hydroxynaphthalene-7-sulfonic acid (hydrolyzed) | orange |
| 15 | 2-Aminonaphthalene-3,6,8-trisulfonic acid ⟶ 2-acetylamino-5-hydroxynaphthalene-7-sulfonic acid (hydrolyzed) | orange |
| 16 | 2-Aminonaphthalene-1,5,7-trisulfonic acid ⟶ 1-acetylamino-5-hydroxynaphthalene-7-sulfonic acid (hydrolyzed) | orange |

TABLE 1-continued

| No. | Chromophore | Shade on cotton |
|---|---|---|
| 17 | 1-Amino-4-methoxybenzene-2,5-disulfonic acid ⟶ 2-amino-5-hydroxynaphthalene-7-sulfonic acid | scarlet |
| 18 | 1-Amino-4-methoxybenzene-2-sulfonic acid ⟶ 2-amino-5-hydroxynaphthalene-7-sulfonic acid | scarlet |
| 19 | 1-Amino-4-methoxybenzene-2-sulfonic acid ⟶ 2-methylamino-5-hydroxynaphthalene-7-sulfonic acid | scarlet |
| 20 | 1-Aminobenzene-2-sulfonic acid ⟶ 1-(4'-nitrobenzoylamino)-8-hydroxynaphthalene-3,6-disulfonic acid (reduced) | red |
| 21 | 1-Amino-3-acetylaminobenzene-6-sulfonic acid ⟶ 1-benzoylamino-8-hydroxynaphthalene-3,6-disulfonic acid (hydrolyzed) | bluish red |
| 22 | 1-Amino-3-acetylaminobenzene-6-sulfonic acid ⟶ 1-acetylamino-8-hydroxynaphthalene-3,6-disulfonic acid (hydrolyzed) | bluish red |
| 23 | 1-Amino-3-acetylaminobenzene-6-sulfonic acid ⟶ 1-benzoylamino-8-hydroxynaphthalene-4,6-disulfonic acid (hydrolyzed) | bluish red |
| 24 | 1-Amino-3-acetylaminobenzene-6-sulfonic acid ⟶ 1-acetylamino-8-hydroxynaphthalene-4,6-disulfonic acid (hydrolyzed) | bluish red |
| 25 | 1-Amino-4-acetylaminobenzene-2-sulfonic acid ⟶ acid 2-amino-8-hydroxynaphthalene-3,6-disulfonic acid (hydrolyzed) | bluish red |
| 26 | 1-Amino-4-acetylaminobenzene-2-sulfonic acid ⟶ acid 2-amino-8-hydroxynaphthalene-6-sulfonic acid (coupled under acid conditions, hydrolyzed) | bluish red |
| 27 | 2-Aminonaphthalene-1,5-disulfonic acid ⟶ 1-amino-8-hydroxynaphthalene-3,6-disulfonic acid | bluish red |
| 28 | 3-Methoxy-4-amino-6-methylazobenzene-2',5'-disulfonic acid ⟶ 2-methylamino-5-hydroxynaphthalene-7-sulfonic acid (coppered with demethylation) | navy |
| 29 | 3-Methoxy-4-amino-6-methylazobenzene-2',4'-disulfonic acid ⟶ 2-amino-5-hydroxynaphthalene-1,7-disulfonic acid (coppered with demethylation) | navy |
| 30 | 1-Amino-3-acetylaminobenzene-6-sulfonic acid ⟶ 1-amino-8-hydroxy-2-(4'-sulfophenylazo)-naphthalene-3,6-disulfonic acid (hydrolyzed) | blue |
| 31 | N—(2-Carboxy-4-sulfophenyl)-N'—(2'-hydroxy-3'-amino-5'-sulfophenyl)-ms-phenylformazan (Cu complex) | blue |
| 32 | N—(2-Carboxy-5-sulfophenyl)-N'—(2'-hydroxy-3'-amino-5'-sulfophenyl)-ms-phenylformazan (Cu complex) | blue |
| 33 | 1-Amino-3-acetylaminobenzene-6-sulfonic acid ⟶ 1-amino-8-hydroxy-2-(2',5'-disulfophenylazo)-naphthalene-3,6-disulfonic acid, hydrolyzed | blue |
| 34 | ½ equivalent of [structure shown] | blue |
| 35 | ½ equivalent of | blue |

TABLE 1-continued

| No. | Chromophore | Shade on cotton |
|-----|-------------|-----------------|
|     | [structure: H₂N(CH₂)₂NH–phenyl(SO₃H)–O–triazine(Cl,Cl)–N–phenyl(SO₃H)–NH(CH₂)₂NH₂] | |
| 36  | ½ equivalent of [structure: H₂N(CH₂)₃NH–phenyl(SO₃H)–O–triazine(Cl,Cl)–N–phenyl(SO₃H)–NH(CH₂)₃NH₂] | blue |
| 37  | ½ equivalent of [structure: H₂N(CH₂)₄NH–phenyl(SO₃H)–O–triazine(Cl,Cl)–N–phenyl(SO₃H)–NH(CH₂)₄NH₂] | blue |
| 38  | 0.8 equivalent of $CuPc$—(3)—[(−SO₃H, −SO₂NH₂)$_{2,6}$, (−SO₂NH—phenyl(NH₂)—SO₃H)$_{1.3}$] | turquoise |
| 39  | ½ equivalent of $CuPc$—(4)—[(−SO₃H, −SO₂NH₂) ~2.0, (−SO₂NH—phenyl(NH₂)—SO₃H) ~2.0] | turquoise |
| 40  | ½ equivalent of: 1-amino-3-acetylaminobenzene-6-sulfonic acid $\xrightarrow{acid}$ 1-amino-8-hydroxynaphthalene-3,6-disulfonic acid $\xleftarrow{alkaline}$ 1-amino-3-acetylaminobenzene-6-sulfonic acid (both acetyl groups hydrolyzed) | blue |
| 41  | ½ equivalent of: 1-amino-3-acetylaminobenzene-6-sulfonic acid $\xrightarrow{acid}$ 1-amino-8-hydroxynaphthalene-3,6-disulfonic acid $\xleftarrow{alkaline}$ 1-amino-4-acetylaminobenzene-2-sulfonic acid (both acetyl groups hydrolyzed) | greenish blue |
| 42  | ½ equivalent of: 1-amino-3-acetylaminobenzene-6-sulfonic acid $\xrightarrow{acid}$ 1-amino-8-hydroxynaphthalene-3,6-disulfonic acid $\xleftarrow{alkaline}$ 1-amino-4-acetylaminobenzene-2,5-disulfonic acid (both acetyl groups hydrolyzed) | greenish blue |
| 43  | ½ equivalent of: 1-amino-3-acetylaminobenzene-2-sulfonic acid $\xrightarrow{acid}$ 1-amino-8-hydroxynaphthalene-3,6-disulfonic acid $\xleftarrow{alkaline}$ 1-amino-4-acetylaminobenzene-2-sulfonic acid (both acetyl groups hydrolyzed) | greenish blue |

TABLE 1-continued

| No. | Chromophore | Shade on cotton |
|---|---|---|
| 44 | ½ equivalent of: 1-amino-3-acetylaminobenzene-2-sulfonic acid $\xrightarrow{acid}$ 1-amino-8-hydroxynaphthalene-3,6-disulfonic acid $\xleftarrow{alkaline}$ 1-amino-3-acetylaminobenzene-6-sulfonic acid (both acetyl groups hydrolyzed) | greenish blue |
| 45 | ½ equivalent of: 1-amino-4-acetylaminobenzene-2-sulfonic acid $\xrightarrow{acid}$ 1-amino-8-hydroxynaphthalene-3,6-disulfonic acid $\xleftarrow{alkaline}$ 1-amino-4-acetylaminobenzene-2,5-disulfonic acid (both acetyl groups hydrolyzed) | greenish blue |
| 46 | ½ equivalent of: 1-amino-4-acetylaminobenzene-2,5-sulfonic acid $\xrightarrow{acid}$ 1-amino-8-hydroxynaphthalene-3,6-disulfonic acid $\xleftarrow{alkaline}$ 1-amino-4-acetylaminobenzene-2,5-disulfonic acid (both acetyl groups hydrolyzed) | greenish blue |
| 47 | ½ equivalent of: 1-amino-4-acetylaminobenzene-2,5-sulfonic acid $\xrightarrow{acid}$ 1-amino-8-hydroxynaphthalene-3,6-disulfonic acid $\xleftarrow{alkaline}$ 1-amino-3-acetylaminobenzene-6-sulfonic acid (both acetyl groups hydrolyzed) | greenish blue |
| 48 | ½ equivalent of: 1-amino-4-acetylaminobenzene-2,5-sulfonic acid $\xrightarrow{acid}$ 1-amino-8-hydroxynaphthalene-3,6-disulfonic acid $\xleftarrow{alkaline}$ 1-amino-4-acetylaminobenzene-2-sulfonic acid (both acetyl groups hydrolyzed) | greenish blue |
| 49 | ½ equivalent of: 1-amino-3-acetylaminobenzene-6-sulfonic acid $\xrightarrow{alkaline}$ 1-amino-8-hydroxynaphthalene-3,6-disulfonic acid (hydroly ed) | bluish red |
| 50 | ½ equivalent of: 1-amino-4-acetylaminobenzene-2-sulfonic acid $\xrightarrow{alkaline}$ 1-amino-8-hydroxynaphthalene-3,6-disulfonic acid (hydroly ed) | violet |
| 51 | ½ equivalent of: 1-amino-3-acetylaminobenzene-6-sulfonic acid $\xrightarrow{alkaline}$ 2-amino-5-hydroxynaphthalene-7-sulfonic acid (hydroly ed) | orange |
| 52 | ½ equivalent of: 1-amino-4-acetylaminobenzene-2-sulfonic acid $\xrightarrow{alkaline}$ 2-amino-5-hydroxynaphthalene-7-sulfonic acid (hydrolyzed) | orange |
| 53 | ½ equivalent of: 1-amino-4-acetylaminobenzene-2,5-disulfonic acid $\xrightarrow{alkaline}$ 2-amino-5-hydroxynaphthalene-7-sulfonic acid (hydrolyzed) | orange |
| 54 | ½ equivalent of: 1-amino-3-acetylaminobenzene-6-sulfonic acid $\xrightarrow{alkaline}$ 3-amino-5-hydroxynaphthalene-7-sulfonic acid (hydrolyzed) | orange |
| 55 | ½ equivalent of: 1-amino-4-acetylaminobenzene-2,5-disulfonic acid $\xrightarrow{alkaline}$ 3-amino-5-hydroxynaphthalene-7-sulfonic acid (hydrolyzed) | orange |

Further reactive dyes which, applied by the dyeing or printing methods described in the examples, produce valuable dyeings or prints respectively in the shade given in Table 1 column 3 are obtained when the amino-containing chromophores specified in Table 1 column 2 are reacted in accordance with the preparation method first with 2,4,6-trifluoro-1,3,5-triazine and then with the polyamino compounds given in Table 2 column 2.

TABLE 2

| No. | Polyamino compound |
|---|---|
| 1 | 1,3-Diaminobenzene-4-sulfonic acid |
| 2 | 1,3-Diaminobenzene |
| 3 | 1,4-Diaminobenzene |
| 4 | 1,5-Diamino-6-methylbenzene-3-sulfonic acid |
| 5 | 1,3-Diamino-6-methylbenzene-4-sulfonic acid |
| 6 | 1,2-Diaminobenzene-4-carboxylic acid |
| 7 | 1,3-Diaminobenzene-4-carboxylic acid |
| 8 | 1,3,5-Triaminobenzene |
| 9 | Ethylenediamine |
| 10 | n-Propylenediamine |
| 11 | 1,3-Diamino-2-hydroxypropane |
| 12 | 1-Amino-3-methylaminopropane |
| 13 | N—2-Aminoethylpiperazine |

What is claimed is:

1. A process for dyeing or printing cellulose-containing textile fiber materials with reactive dyes, which comprises using reactive dyes of the formula

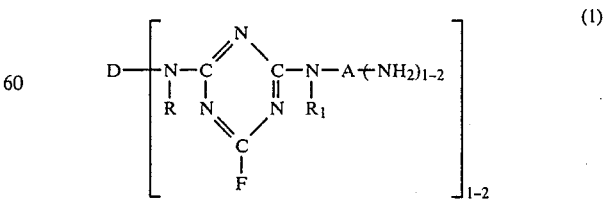

in which D is the radical of an organic dye, R and R₁ independently of each other are hydrogen or substituted or unsubstituted $C_{1-4}$-alkyl, and A is a substituted or unsubstituted aliphatic or aromatic radical.

2. A process according to claim 1, wherein the reactive dyes used have the formula (1) in which D is the radical of a sulfo-containing organic dye of the monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarboximide series.

3. A process according to claim 2, wherein in the reactive dyes used D is as defined in claim 2, R and $R_1$ independently of each other are hydrogen, methyl or ethyl, and A is substituted or unsubstituted $C_{2-6}$-alkylene or substituted or unsubstituted phenylene or naphthylene.

4. A process according to claim 3, wherein the reactive dyes used have the formula

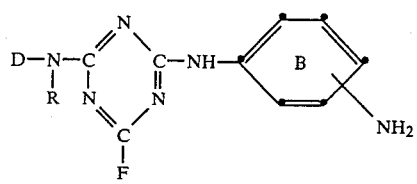

in which D and R are as defined in claim 3, and the benzene radical B can contain as further substituents $C_{1-4}$-alkyl, $C_{1-4}$-alkoxy, halogen, carboxyl, sulfo or amino.

5. A process according to claim 4, wherein the reactive dyes used have the formula

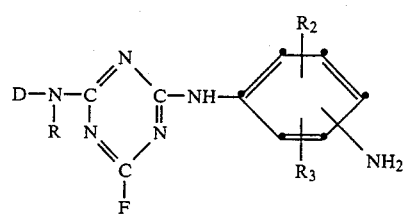

in which D and R are as defined in claim 4, $R_2$ is hydrogen or methyl, and $R_3$ is hydrogen, carboxyl, sulfo or amino.

6. A process according to claim 3, wherein the reactive dyes used have the formula

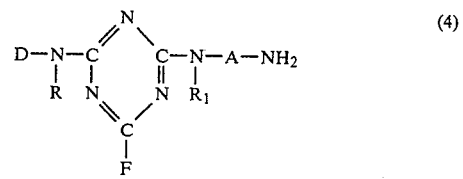

in which D, R and $R_1$ are as defined in claim 3, and A is ethylene or propylene which can be substituted by hydroxyl.

7. A process according to claim 3, wherein in the reactive dyes used D is the radical of a monoazo or disazo dye, and R, $R_1$ and A are as defined in claim 3.

8. A process according to claim 3, wherein in the reactive dyes used D is the radical of a metal complex azo or formazan dye, and R, $R_1$ and A are as defined in claim 3.

9. A process according to claim 3, wherein in the reactive dyes used D is the radical of an anthraquinone dye, and R, $R_1$ and A are as defined in claim 3.

10. A process according to claim 8, wherein in the reactive dyes used D is the radical of a metal complex azo dye of the benzene or naphthalene series, and R, $R_1$ and A are as defined in claim 8.

11. A process according to claim 10, wherein in the reactive dyes used D is the radical of a 1:1 copper complex azo dye of the benzene or naphthalene series, and the copper atom is bonded on either side to a metallizable group in orthoposition relative to the azo bond, and R, $R_1$ and A are as defined in claim 10.

12. A process according to claim 7, wherein the reactive dyes used have the formula

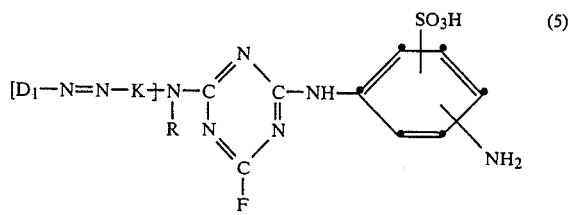

in which $D_1$ is the radical of a diazo component of the benzene or naphthalene series, K is the radical of a coupling component of the benzene or naphthalene series or of the heterocyclic series, and R is hydrogen or substituted or unsubstituted $C_{1-4}$-alkyl, and the reactive radical is bonded to the diazo component or to the coupling component.

13. A process according to claim 12, wherein the reactive dyes used have the formula (5) in which R is hydrogen, methyl or ethyl.

14. A process according to claim 1, for dyeing cellulose fibers.

15. A process according to claim 14, wherein dyeing is carried out by the exhaust, cold pad-batch or pad-steam method.

16. The cellulose-containing textile fiber material dyed or printed by a process according to claim 1.

* * * * *

UNITED STATES PATENT AND TRADEMARK OFFICE
CERTIFICATE OF CORRECTION

PATENT NO. : 4,523,925

DATED : June 18, 1985

INVENTOR(S) : Peter Scheibli

It is certified that error appears in the above-identified patent and that said Letters Patent is hereby corrected as shown below:

1st page, under "Foreign Application Priority Data"  Delete "Sep. 6, 1982" and substitute --Jun. 9, 1982--

Col. 7, line 43  Delete beginning of structure and substitute

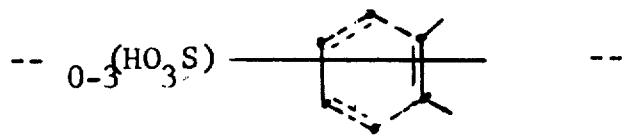

Col. 19, No. 26 of Table 1  After " → " delete "acid"

Signed and Sealed this

Twenty-fourth Day of December 1985

[SEAL]

Attest:

DONALD J. QUIGG

Attesting Officer

Commissioner of Patents and Trademarks